US012772054B2

(12) United States Patent
Phan et al.

(10) Patent No.: US 12,772,054 B2
(45) Date of Patent: Oct. 20, 2026

(54) METHOD TO PREVENT HIDDEN COMMUNICATION ON A CHANNEL DURING DEVICE AUTHENTICATION, CORRESPONDING VPLMN AND HPLMN

(71) Applicant: THALES DIS FRANCE SAS, Meudon (FR)

(72) Inventors: Ly-Thanh Phan, Le Plessis Robinson (FR); Mireille Pauliac, Carnoux en Provence (FR)

(73) Assignee: THALES DIS FRANCE SAS, Meudon (FR)

( * ) Notice: Subject to any disclaimer, the term of this patent is extended or adjusted under 35 U.S.C. 154(b) by 391 days.

(21) Appl. No.: 18/572,822

(22) PCT Filed: Jun. 6, 2022

(86) PCT No.: PCT/EP2022/065293

§ 371 (c)(1),
(2) Date: Dec. 21, 2023

(87) PCT Pub. No.: WO2022/268487

PCT Pub. Date: Dec. 29, 2022

(65) Prior Publication Data

US 2024/0298175 A1 Sep. 5, 2024

(30) Foreign Application Priority Data

Jun. 23, 2021 (EP) .................................... 21305861

(51) Int. Cl.
*H04W 12/06* (2021.01)
*H04W 12/69* (2021.01)
*H04W 84/04* (2009.01)

(52) U.S. Cl.
CPC .......... *H04W 12/06* (2013.01); *H04W 12/69* (2021.01); *H04W 84/042* (2013.01)

(58) Field of Classification Search
CPC ... H04W 12/06; H04W 12/69; H04W 84/042; H04W 12/122; H04L 63/1441
See application file for complete search history.

(56) References Cited

U.S. PATENT DOCUMENTS

2010/0064135 A1* 3/2010 Thakare .............. H04W 12/122 713/171
2011/0004762 A1* 1/2011 Horn ..................... H04W 12/04 713/171
2019/0182654 A1* 6/2019 Jerichow ............... H04L 9/3213

FOREIGN PATENT DOCUMENTS

FR 2877789 A1 5/2006

OTHER PUBLICATIONS

International Search Report (PCT/ISA/210) and Written Opinion (PCT/ISA/237) mailed on Sep. 2, 2022, by the European Patent Office as the International Searching Authority for current International Application No. PCT/EP2022/065293—[15 pages].

(Continued)

*Primary Examiner* — Kiet Tang

(57) ABSTRACT

The disclosure concerns a method for preventing transmission of hidden information in a communication channel during a telecommunication terminal authentication phase including transmitting from a telecommunication terminal cooperating with a secure element to a visited PLMN a unique identifier of the secure element; generating at the visited PLMN a required information and sending the unique identifier and the required information to a home PLMN identified by a MCC/MNC in the unique identifier; generating a random value and computing a cryptographic value based on the random value and the required information; generating an authentication vector based on the cryptographic value and the long term key of the secure element, the long term key being associated to the unique identifier, and sending the authentication vector and the random value (Continued)

or only the authentication vector containing the random value instead of the cryptographic value to the visited PLMN.

10 Claims, 3 Drawing Sheets

(56) References Cited

OTHER PUBLICATIONS

Ghader Ebrahimpour et al: "Introducing the GBA Covert Channel in IP Multimedia Subsystem (IMS)" In: "Computer Vision, Pattern Recognition, Image Processingi and Graphics : 7th National Conference, NCVPRIPG 2019, Hubballi, India, Dec. 22-24, 2019, Revised Selected Papers", Jan. 1, 2014 (Jan. 1, 2014), Springer, DE, XP055305131, ISBN: 978-981-1586-97-2; vol. 428, pp. 13-22, DOI: 10.1007/978-3-319-10903-9_2, the whole document.

* cited by examiner

METHOD TO PREVENT HIDDEN COMMUNICATION ON A CHANNEL DURING DEVICE AUTHENTICATION, CORRESPONDING VPLMN AND HPLMN

FIELD OF USE

The present invention concerns telecommunications in 2G to 5G networks. More precisely, the invention concerns the ability for a secure element, like a SIM card, a UICC, a eUICC or an iUICC to connect to a home network (HPLMN).

Such secure elements are cooperating with terminals (or devices) that can be fixed (IoT applications) or mobile (smartphones, PDAs, connected watches, . . . ).

BACKGROUND

It is known that secure elements are normally owned by a MNO and the device with which they cooperate attach themselves to the network of the MNO (Mobile Network Operator) identified by its MCC/MNC (Mobile Country Code/Mobile Network Code) that is present in an identifier of the secure element.

In telecommunication systems, a network operator allocates to each secure element a unique identifier, known up to the 4G as an IMSI (International Mobile Subscriber Identity) and for the 5G as a SUPI (Subscription Permanent Identifier). This unique identifier is sent by the device to the telecommunication network in order to establish a mutual authentication between the secure element and the network infrastructure. This is compliant with the 3GPP specifications.

In 3GPP, the authentication process is based on a device sending its identity (IMSI, SUPI) to the HPLMN (Home PLMN) via a VPLMN (Visited PLMN, in roaming cases, national or international), and the network sends a random challenge to the device. PLMN stands for Public Land Mobile Network. The device then sends back a response back to the network based on that challenge and its shared secret key (long term key also called K) with the HPLMN through the VPLMN.

Before the verification by the VPLMN that the response is valid, the device is not considered as authenticated, thus the device and HPLMN are not allowed to exchange information other than needed for the authentication process.

However, it is possible in this early stage for the HPLMN to send information to the device by encrypting the information with the shared secret key for instance in the challenge payload that then looks like a random challenge. After receiving the information, the device is able to authenticate the home network, to decipher the information, and may terminate the authentication process. In such case, data have been exchanged between the home network and the device, while the device has not been authenticated.

The ability for the HPLMN to send hidden message before the device is fully authenticated has potentially the following undesired effects:

- The VPLMN may be used abusively for communication without being able to charge the MNO's HPLMN;
- Law enforcement is not able to implement lawful interception;
- The 3GPP network does not offer sufficient capability to the VPLMN to comply with lawful interception regulation.

SUMMARY

It is thus important to detect that the home network generates an authentication vector which challenge can be proven not to contain a hidden message.

This goal is reached thanks to a method for preventing transmission of hidden information in a communication channel during a telecommunication terminal authentication phase, the method comprising:

- Transmitting from a telecommunication terminal cooperating with a secure element to a visited PLMN a unique identifier of the secure element;
- Generating at the visited PLMN a required information and sending the unique identifier and the required information to a home PLMN identified by a MCC/MNC comprised in the unique identifier;
- At the home PLMN, generating a random value and computing a cryptographic value based on the random value and the required information;
- At the home PLMN, generating an authentication vector based on the cryptographic value and the long term key of the secure element, the long term key being associated to the unique identifier, and sending the authentication vector and the random value or only the authentication vector containing the random value instead of the cryptographic value to the visited PLMN;
- At the visited PLMN:
  - If the home PLMN has sent the authentication vector and the random value, computing a cryptographic value from the required information and the random value, verifying that the cryptographic value received in the authentication vector corresponds to the cryptographic value computed at the visited PLMN and, if yes, transmitting from the visited PLMN to the telecommunication terminal the cryptographic value and the authentication token retrieved from the authentication vector;
  - If the home PLMN has sent only the authentication vector containing the random value instead of the cryptographic value, computing another cryptographic value from the required information and the random value, and transmitting from the visited PLMN to the telecommunication terminal the other cryptographic value and the authentication token retrieved from the authentication vector.

Preferably, the cryptographic value is a hash of a concatenation of the required information and the random value.

The required information contains advantageously at least a random value.

The invention also concerns a PLMN acting as a visited PLMN, the visited PLMN receiving a unique identifier from a telecommunication device cooperating with a secure element during an authentication phase, the visited PLMN being configured for generating a required information and sending the unique identifier and the required information to a home PLMN identified by a MCC/MNC comprised in the unique identifier, the visited PLMN:

- If the home PLMN has sent the authentication vector and a random value, computing a cryptographic value from the required information and the random value, verifying that the cryptographic value received in the authentication vector corresponds to the cryptographic value computed at the visited PLMN and, if yes, transmitting from the visited PLMN to the telecommunication terminal the cryptographic value and the authentication token retrieved from the authentication vector;

If the home PLMN has sent only the authentication vector containing the random value instead of the cryptographic value, computing another cryptographic value from the required information and the random value, and transmitting from the visited PLMN to the telecommunication terminal the other cryptographic value and the authentication token retrieved from the authentication vector.

The cryptographic value is preferably a hash of a concatenation of the required information and the random value.

Advantageously, the required information contains at least a random value.

The invention also concerns a PLMN acting as a home PLMN, the home PLMN being configured for:

receiving from a visited PLMN a required information and a unique identifier of a secure element cooperating with a telecommunication terminal;

generating:

a random value and computing a cryptographic value based on the random value and the required information, or an authentication vector based on the cryptographic value and the long term key of the secure element, the long term key being associated to the unique identifier, and sending the authentication vector and the random value or only the authentication vector containing the random value instead of the cryptographic value to the visited PLMN.

The cryptographic value is preferably a hash of a concatenation of the required information and the random value.

Advantageously, the required information contains at least a random value.

DESCRIPTION OF THE DRAWINGS

Other features and advantages of the present invention will appear in the description below of the figures that represent.

DETAILED DESCRIPTION

Figure 1:
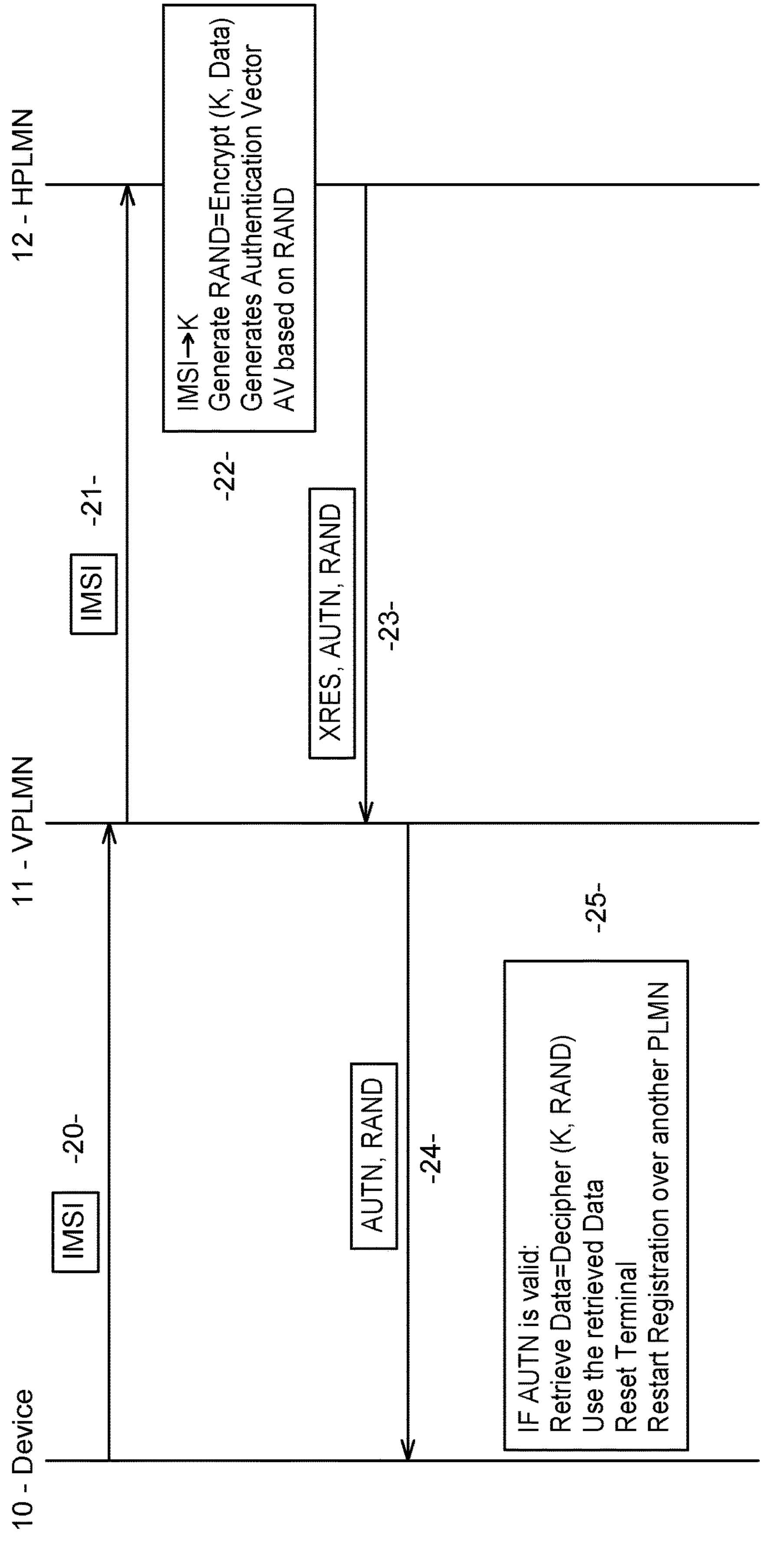
FIG. 1, the hidden channel process of the prior art.

FIG. 1 represents the hidden channel process of the prior art.

In this figure, three entities are represented: A device 10 (also called telecommunication terminal) cooperating with a secure element (SIM card, UICC, eUICC or iUICC for example), a visited PLMN 11 (noted VPLMN), and a home PLMN 12 (noted HPLMN).

It is here supposed that the device/secure element 10 is roaming in the visited PLMN 11.

At first power on (step 20), the device/secure element 10 sends a unique identifier (IMSI for example) to the best received VPLMN 11. The VPLMN 11, in view of the MCC/MNC comprised in the IMSI, sends the IMSI to the HPLMN 12 at step 21 regarding the MCC/MNC code comprised in the unique identifier.

The HPLMN 12 associates at step 22 the received IMSI with the corresponding long term key K and generates a random value RAND that is a Data encrypted by K. It then generates an authentication vector comprising RAND.

For example, an authentication vector (AV) is typically (in 4G) equal to:

$$AV = RAND \| XRES \| CK \| IK \| AUTN$$

where II represents a concatenation. CK and IK are keys derived from the long term key K and RAND.

At step 23, AV containing at least the authentication token (AUTN) and RAND is transmitted from the HPLMN 12 to the VPLMN 11. The VPLMN sends at step 24 the authentication token AUTN and RAND to the device/secure element 10.

At step 25, if AUTN is considered as valid, the device/secure element 10 retrieves the Data by deciphering RAND with K and uses the retrieved Data.

This mechanism allows the HPLMN 12 to send an encrypted Data to the device/secure element 10 without possibility for the VPLMN 11 to know that such a Data has been transferred through its network (the VPLMN 11 only sees a value that it considers as a RAND, this RAND field in fact comprising a Data).

Figure 2:
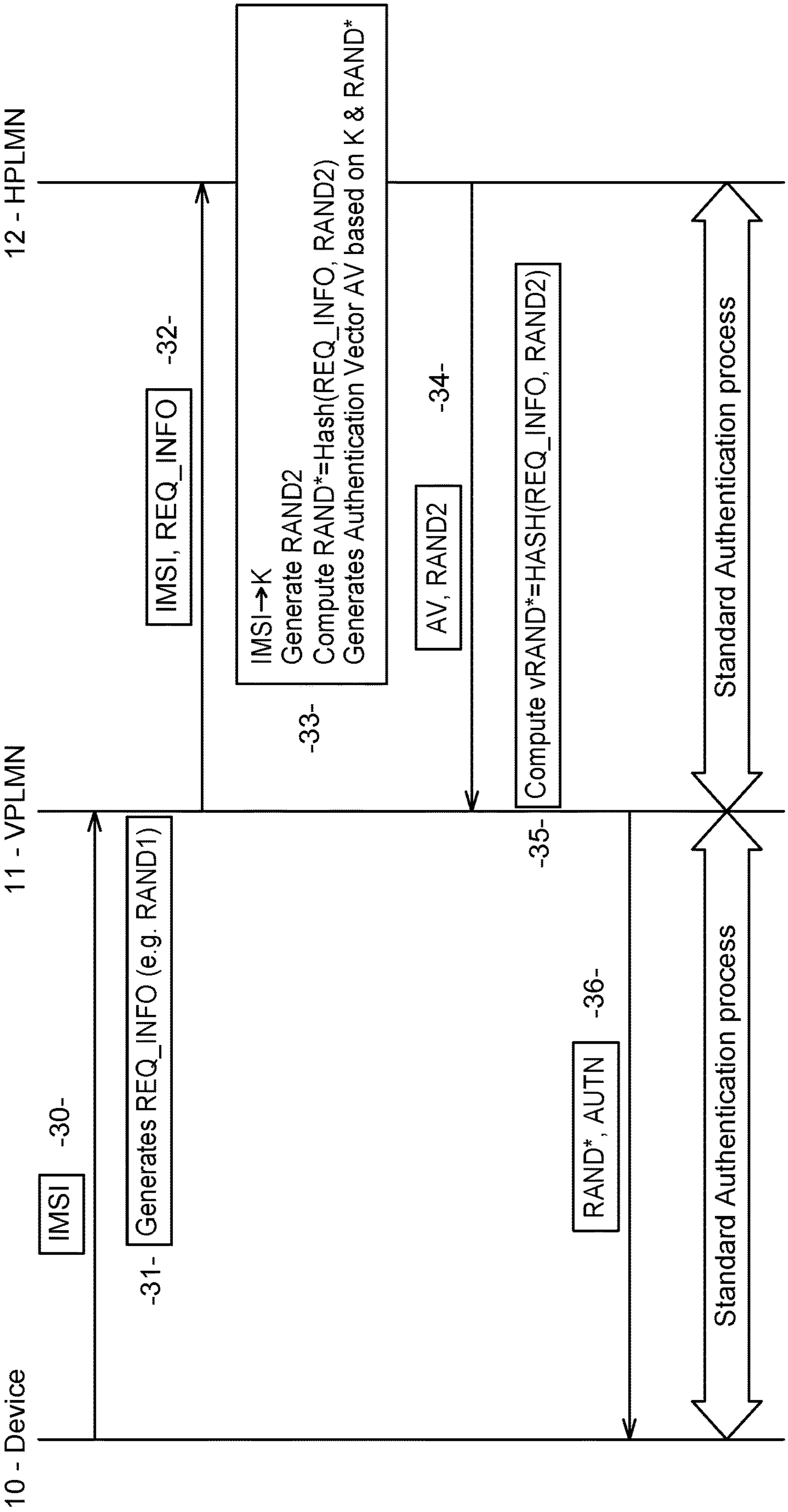
FIG. 2, the process according to the present invention intended to prevent hidden communication channel during device authentication.

The problems described above are solved by the following invention that consists in, in regard of FIG. 2 that describes the process intended to prevent hidden communication channel during device authentication phase:

At step 30, like at step 20 in FIG. 1, the telecommunication terminal 10 cooperating with a secure element sends to the visited PLMN 11 a unique identifier of the secure element (for example an IMSI or a SUPI);

At step 31, the visited PLMN 11 generates a required information REQ_INFO. The REQ_INFO corresponds to a request for information. It can for example comprise a random number RAND1 (or an unpredictable value or parameter values that the HPLMN 12 cannot predict). This is done during the device authentication phase as specified in 3GPP TS 33.102, 3GPP TS 33.401 or 3GPP TS 33.501;

At step 32, the VPLMN 11 sends REQ_INFO and the unique identifier to the HPLMN 12 of the device (e.g. based on the received IMSI or SUPI of the device). The HPLMN 12 can be identified by the MCC/MNC comprised in the unique identifier.

At step 33, the home PLMN 12, at the reception of the REQ_INFO, retrieves the long term key K corresponding to the received unique identifier and generates a random value RAND2. It can then compute a cryptographic value RAND* based on the random value and the required information REQ_INFO. This can be done for example by computing a HMAC of the concatenation of REQ_INFO and RAND2, where REQ_INFO can correspond to RAND1 or contains at least RAND1. The HMAC is a preferred embodiment but any cryptographic operation can be used. RAND* is therefore not a value computed solely by the HPLMN since it contains REQ_INFO generated by the VPLMN 11. The computation of RAND* does not need to use secret keys. The HPLMN 12 then generates an authentication vector AV based on the computed cryptographic value RAND* and the long term key K associated to the received device identity (IMSI or SUPI) as specified by 3GPP TS 33.102, 3GPP TS 33.401 or 3GPP TS 33.501.

At step 34, the HPLMN 12 sends the authentication vector AV and the random value RAND2 to the visited PLMN 11. It is optional for the HPLMN 12 to send the RAND* information to the VPLMN 11 as it can be derived from RAND2 as it will be described in regard of FIG. 3.

At step 35, upon reception of the authentication vector, the VPLMN 11 computes a value vRAND* (verify RAND*) from its own REQ_INFO and the received RAND2. This cryptographic operation is the same as the one done at the level of the HPLMN 12 (the VPLMN 11 knows REQ_INFO that it has generated and RAND2 that it has received). The VPLMN 11 then verifies that the random value received in the authentication vector corresponds to an expected value (vRAND*=RAND*?) and, if yes, transmits to the telecommunication terminal 10 the cryptographic value RAND* and the authentication token AUTN.

So, if the correct RAND* (without adding any information or data) has been provided by the HPLMN 12 to the VPLMN 11, the VPLMN 11 can verify that vRAND* and the received RAND* are equal:

If they are equal, the VPLMN 11 can then send the computed vRAND* (or RAND*) to the device 10 as a challenge, along with the AUTN of the received authentication vector from the HPLMN 12.

If vRAND* is different from RAND*, the VPLMN 11 considers that some information or data have been added in the RAND field and does not forward RAND* and AUTN to the device/secure element 10. Authentication then fails.

The rest of the authentication process follows the standard procedure as specified in 3GPP TS 33.102, 3GPP TS 33.401 or 3GPP TS 33.501 (authentication between the device 10 and the VPLMN 11 and authentication between the VPLMN 11 and the HPLMN 12).

Figure 3:
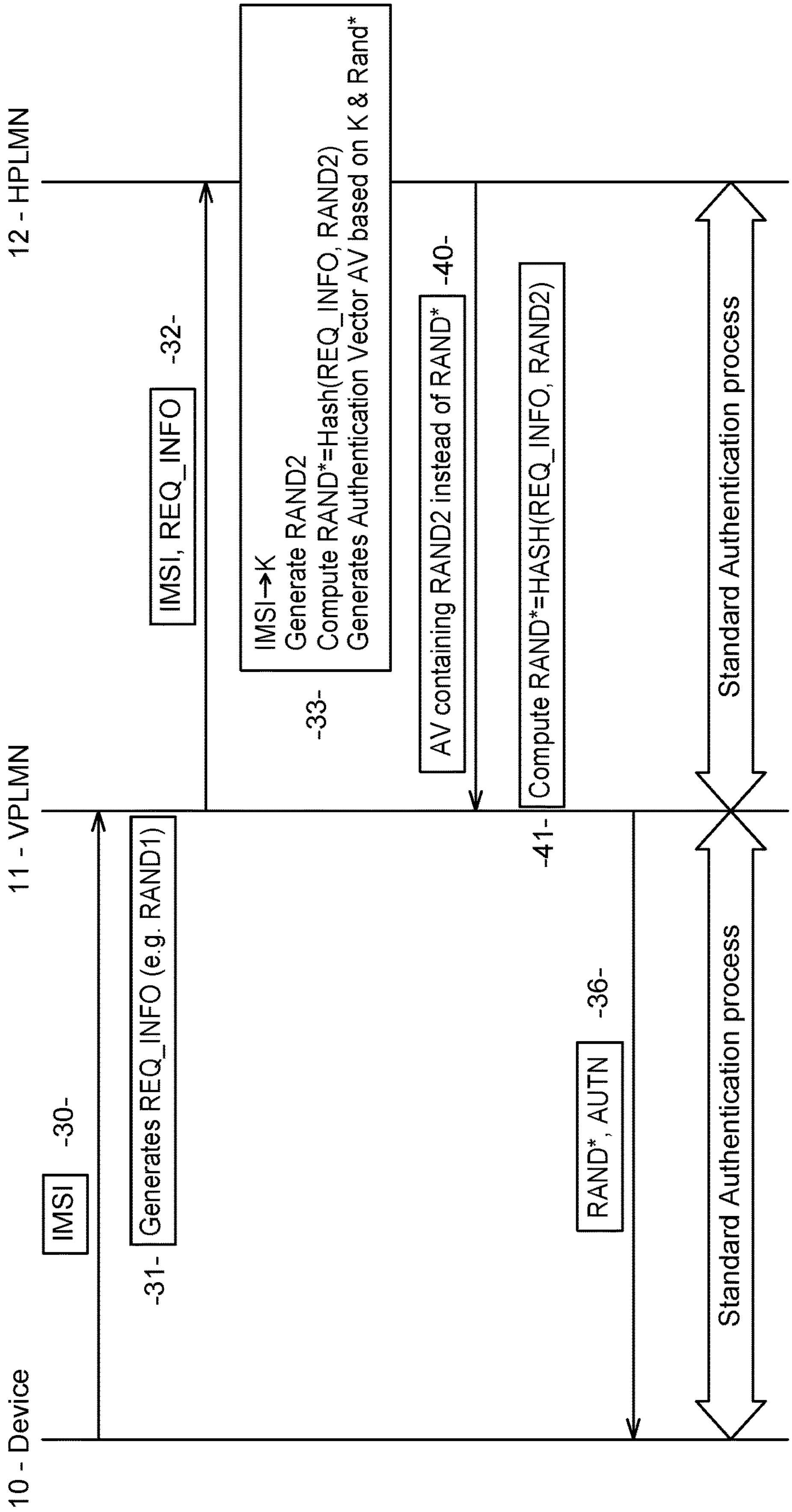
FIG. 3, an alternative to the process of FIG. 2.

FIG. 3 represents an alternative to the process of FIG. 2. In this figure, steps 30-33 and 36 are identical to the steps described above in regard of FIG. 2. The differences are here represented during steps 40 and 41.

At step 40, the HPLMN 12 sends an authentication vector AV by replacing RAND* with RAND2. Only AV is sent to the VPLMN 11, this AV containing RAND2. This corresponds to the standard protocol where only an AV is sent from the HPLMN 12 to the VPLMN 11 (and not an AV and RAND2 as described in regard in FIG. 2).

At step 41, upon reception of the authentication vector AV, the VPLMN 11 computes a value RAND* from its own REQ_INFO and the received RAND2. This cryptographic operation is the same as the one done at the level of the HPLMN 12 (the VPLMN 11 knows REQ_INFO that it has generated and RAND2 that it has received). There is here no comparison between a received RAND* and a vRAND*. The VPLMN 11 then transmits (step 36) to the telecommunication terminal 10 the cryptographic value RAND* and the authentication token AUTN.

As before described in regard of FIG. 2, the rest of the authentication process follows the standard procedure as specified in 3GPP TS 33.102, 3GPP TS 33.401 or 3GPP TS 33.501 (authentication between the device 10 and the VPLMN 11 and authentication between the VPLMN 11 and the HPLMN 12).

So, this solution makes it very difficult for the HPLMN 12 to hide more than few bits in the RAND field:

The probability to obtain n bits with specific values in the RAND2 per derivation by the HPLMN 12 is ½" (due to the hash);

The proposed solution still allows the HPLMN 12 to use few bits of the RAND* as indicators but the HPLMN 12 needs to perform few attempts in order to set one or two bits to arbitrary values. But it is very time and processing power consuming to code an information in more than one or two bits;

The HPLMN 12 cannot perform computation in advance as the value of REQ_INFO provided by the VPLMN 11 cannot be known in advance (even more so if it contains a random number field RAND1);

The request for authentication vectors has to be performed within a very short time period in order to minimize the delay for the connection of the device to the network.

The invention also concerns a PLMN acting as a visited PLMN acting as a visited PLMN 11, the visited PLMN 11 receiving a unique identifier from a telecommunication device 10 cooperating with a secure element during an authentication phase, the visited PLMN 11 being configured for generating a required information REQ_INFO and sending the unique identifier and the required information REQ_INFO to a home PLMN 12 identified by a MCC/MNC comprised in the unique identifier, the visited PLMN 11:

If the home PLMN 12 has sent the authentication vector AV and a random value RAND2, computing a cryptographic value vRAND* from the required information REQ_INFO and the random value RAND2, verifying that the cryptographic value RAND* received in the authentication vector AV corresponds to the cryptographic value vRAND* computed at the visited PLMN 11 and, if yes, transmitting from the visited PLMN 11 to the telecommunication terminal 10 the cryptographic value RAND* and the authentication token AUTN retrieved from the authentication vector AV.

If the home PLMN 12 has sent only the authentication vector AV containing the random value RAND2 instead of the cryptographic value RAND*, computing another cryptographic value RAND* from the required information REQ_INFO and the random value RAND2, and transmitting from the visited PLMN 11 to the telecommunication terminal 10 the other cryptographic value RAND* and the authentication token AUTN retrieved from the authentication vector AV.

Finally, the invention concerns a PLMN acting as a home PLMN 12, the home PLMN 12 being configured for:

receiving from a visited PLMN 11 a required information REQ_INFO and a unique identifier of a secure element cooperating with a telecommunication terminal;

generating:

a random value RAND2 and computing a cryptographic value RAND* based on the random value RAND2 and the required information REQ_INFO, or an authentication vector AV based on the cryptographic value RAND* and the long term key of the secure element, the long term key being associated to the unique identifier, and sending the authentication vector AV and the random value RAND2 or only the authentication vector AV containing the random value RAND2 instead of the cryptographic value RAND* to the visited PLMN 11.

The proposed solution does not require any change in the secure element. It only requires a change of process in the HPLMN 12 for the generation of RAND* and a change of process in the VPLMN 11 to perform the computation of vRAND* and verification of RAND*. The invention applies to telecommunication networks of 3G, 4G and 5G generations.

The invention ensures the VPLMN 11 that the authentication process is based on a value that is not under exclusive control of the HPLMN 12.

The invention claimed is:

1. Method for preventing transmission of hidden information in a communication channel during a telecommunication terminal authentication phase, said method comprising:

Transmitting from the telecommunication terminal cooperating with a secure element to a visited public land mobile network PLMN, a unique identifier of said secure element;

Generating at said visited PLMN a required information and sending said unique identifier and said required information to a home PLMN identified by a Mobile Country Code/Mobile Network Code (MCC/MNC) comprised in said unique identifier;

At said home PLMN, generating a random value and computing a cryptographic value based on said random value and said required information;

At said home PLMN, generating an authentication vector based on said cryptographic value and a long-term key of said secure element, said long-term key being associated to said unique identifier, and sending said authentication vector and said random value or only said authentication vector containing said random value instead of said cryptographic value to said visited PLMN;

At said visited PLMN:

If said home PLMN has sent said authentication vector and said random value, computing a cryptographic value from said required information and said random value, verifying that said cryptographic value received in said authentication vector corresponds to the cryptographic value computed at said visited PLMN and, if yes, transmitting from said visited PLMN to said telecommunication terminal said cryptographic value and the authentication token retrieved from said authentication vector;

If said home PLMN has sent only said authentication vector containing said random value instead of said cryptographic value, computing another cryptographic value from said required information and said random value, and transmitting from said visited PLMN to said telecommunication terminal said other cryptographic value and the authentication token retrieved from said authentication vector.

2. The method according to claim 1, wherein said cryptographic value is a hash of a concatenation of said required information and said random value.

3. The method according to claim 1, wherein said required information contains at least a random value.

4. A public land mobile network (PLMN) acting as a visited PLMN, said visited PLMN comprising processing means for:

receiving a unique identifier from a telecommunication device cooperating with a secure element during an authentication phase, generating a required information and sending said unique identifier and said required information to a home PLMN identified by a Mobile Country Code/Mobile Network Code (MCC/MNC) comprised in said unique identifier, said visited PLMN:

If said home PLMN has sent an authentication vector and a random value, computing a cryptographic value from said required information and said random value, verifying that said cryptographic value received in said authentication vector corresponds to the cryptographic value computed at said visited PLMN and, if yes, transmitting from said visited PLMN to a telecommunication terminal said cryptographic value and an authentication token retrieved from said authentication vector;

If said home PLMN has sent only said authentication vector containing said random value instead of said cryptographic value, computing another cryptographic value from said required information and said random value, and transmitting from said visited PLMN to said telecommunication terminal said other cryptographic value and the authentication token retrieved from said authentication vector.

5. The visited PLMN according to claim 4, wherein said cryptographic value is a hash of a concatenation of said required information and said random value.

6. The visited PLMN according to claim 4, wherein said required information contains at least a random value.

7. A public land mobile network, PLMN, acting as a home PLMN, said home PLMN comprising processing means for:

receiving from a visited PLMN a required information and a unique identifier of a secure element cooperating with a telecommunication terminal;

generating:

a random value and computing a cryptographic value based on said random value and said required information, and an authentication vector based on said cryptographic value and a long-term key of said secure element, said long-term key being associated to said unique identifier, and sending said authentication vector and said random value or only said authentication vector containing said random value instead of said cryptographic value to said visited PLMN.

8. The home PLMN according to claim 7, wherein said cryptographic value is a hash of a concatenation of said required information and said random value.

9. The home PLMN according to claim 7, wherein said required information contains at least a random value.

10. The home PLMN of claim 7, wherein said visited PLMN comprising processing means for:

receiving a unique identifier from a telecommunication device cooperating with a secure element during an authentication phase, generating a required information and sending said unique identifier and said required information to a home PLMN identified by a Mobile Country Code/Mobile Network Code (MCC/MNC) comprised in said unique identifier, said visited PLMN:

If said home PLMN has sent an authentication vector and a random value, computing a cryptographic value from said required information and said random value, verifying that said cryptographic value received in said authentication vector corresponds to the cryptographic value computed at said visited PLMN and, if yes, transmitting from said visited PLMN to a telecommunication terminal said cryptographic value and an authentication token retrieved from said authentication vector;

If said home PLMN has sent only said authentication vector containing said random value instead of said cryptographic value, computing another cryptographic value from said required information and said random value, and transmitting from said visited PLMN to said telecommunication terminal said other cryptographic value and the authentication token retrieved from said authentication vector.

* * * * *